US012416135B2

(12) United States Patent
Takahashi et al.

(10) Patent No.: US 12,416,135 B2
(45) Date of Patent: Sep. 16, 2025

(54) ELECTRICALLY DRIVEN HYDRAULIC WORK MACHINE

(71) Applicant: Hitachi Construction Machinery Tierra Co., Ltd., Koka (JP)

(72) Inventors: Kiwamu Takahashi, Moriyama (JP); Seiichi Kihara, Koka (JP); Yuichi Ogawa, Koka (JP); Takeshi Ishii, Hino-cho (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 555 days.

(21) Appl. No.: 17/595,712

(22) PCT Filed: Sep. 24, 2019

(86) PCT No.: PCT/JP2019/037330
§ 371 (c)(1),
(2) Date: Nov. 23, 2021

(87) PCT Pub. No.: WO2021/059337
PCT Pub. Date: Apr. 1, 2021

(65) Prior Publication Data
US 2022/0259821 A1 Aug. 18, 2022

(51) Int. Cl.
*E02F 9/20* (2006.01)
*E02F 3/32* (2006.01)
(Continued)

(52) U.S. Cl.
CPC ............ *E02F 9/207* (2013.01); *E02F 9/2235* (2013.01); *E02F 9/2292* (2013.01);
(Continued)

(58) Field of Classification Search
CPC ....... E02F 9/207; E02F 9/2235; E02F 9/2292; E02F 9/2296; E02F 3/325; E02F 9/2285;
(Continued)

(56) References Cited

U.S. PATENT DOCUMENTS

| | | | | |
|---|---|---|---|---|
| 2002/0123836 A1* | 9/2002 | Komiyama | ........... | B60W 10/04 180/65.245 |
| 2005/0001567 A1 | 1/2005 | Yoshimatsu | | |
| 2008/0072588 A1* | 3/2008 | Ariga | .................... | E02F 9/2235 60/449 |

(Continued)

FOREIGN PATENT DOCUMENTS

| | | | |
|---|---|---|---|
| EP | 3 674 563 | A1 | 7/2020 |
| JP | 2003-155760 | A | 5/2003 |
| JP | 2009-84838 | A | 4/2009 |
| WO | WO 2010/082636 | A1 | 7/2010 |
| WO | WO 2013/164928 | A1 | 11/2013 |
| WO | WO 2014/084213 | A1 | 6/2014 |
| WO | WO 2018/168887 | A1 | 9/2018 |

OTHER PUBLICATIONS

International Search Report (PCT/ISA/210) issued in PCT Application No. PCT/JP2019/037330 dated Dec. 17, 2019 with English translation (four (4) pages).

(Continued)

*Primary Examiner* — Thomas E Worden
*Assistant Examiner* — Elizabeth Rose Neleski
(74) *Attorney, Agent, or Firm* — Crowell & Moring LLP

(57) ABSTRACT

In a hydraulic drive system used for an electrically driven hydraulic work machine that drives a hydraulic pump by an electric motor and supplies a hydraulic fluid to plural actuators to carry out work, the power consumption of the hydraulic pump is kept from exceeding a value decided in advance. For this purpose, a controller calculates target power to be consumed by the hydraulic pump on the basis of the capacity of the hydraulic pump, the delivery pressure of the hydraulic pump sensed by a pressure sensor, and a target revolution speed of the electric motor, and limits the target revolution speed of the electric motor in such a manner that the target power falls within a range of the maximum allowable power.

3 Claims, 8 Drawing Sheets

(51) Int. Cl.
*E02F 9/22* (2006.01)
*F15B 15/18* (2006.01)

(52) U.S. Cl.
CPC ............ *E02F 9/2296* (2013.01); *F15B 15/18* (2013.01); *E02F 3/325* (2013.01); *E02F 9/2285* (2013.01)

(58) Field of Classification Search
CPC ....... E02F 9/2246; E02F 9/2282; F15B 15/18; F15B 21/087; F15B 2211/20515; F15B 2211/20538; F15B 2211/20553; F15B 2211/20576; F15B 2211/30535; F15B 2211/3111; F15B 2211/3116; F15B 2211/50536; F15B 2211/528; F15B 2211/6058; F15B 2211/6309; F15B 2211/6346; F15B 2211/6355; F15B 2211/6651; F15B 2211/6655; F15B 11/04; F15B 13/042; F15B 2211/20546; F04B 2203/0208; F04B 2205/05; F04B 49/065; F04B 49/06
See application file for complete search history.

(56) References Cited

U.S. PATENT DOCUMENTS

| | | | | |
|---|---|---|---|---|
| 2011/0276212 | A1 | 11/2011 | Wu | |
| 2015/0040553 | A1 | 2/2015 | Takahashi et al. | |
| 2015/0300378 | A1 * | 10/2015 | Udagawa | E02F 9/2235 60/449 |
| 2019/0194910 | A1 * | 6/2019 | Takahashi | E02F 9/22 |
| 2020/0224389 | A1 * | 7/2020 | Takahashi | E02F 9/2246 |

OTHER PUBLICATIONS

Japanese-language Written Opinion (PCT/ISA/237) issued in PCT Application No. PCT/JP2019/037330 dated Dec. 17, 2019 (six (6) pages).
International Preliminary Report on Patentability (PCT/IB/338 & PCT/IB/373) issued in PCT Application No. PCT/JP2019/037330 dated Apr. 7, 2022, including English translation of document C2 (Japanese-language Written Opinion (PCT/ISA/237) filed on Nov. 23, 2021) (12 pages).
Extended European Search Report issued in European Application No. 19946733.3 dated May 4, 2023 (8 pages).

* cited by examiner

ELECTRICALLY DRIVEN HYDRAULIC WORK MACHINE

TECHNICAL FIELD

The present invention relates to an electrically driven hydraulic work machine such as a hydraulic excavator that drives a hydraulic pump by an electric motor and carries out various kinds of work.

BACKGROUND ART

Electrically driven hydraulic work machines such as hydraulic excavators that drive a hydraulic pump by an electric motor and carry out various kinds of work by plural actuators have been used in environments in which exhaust gas emission is unfavorable, for example in work environments of indoor site, underground, and so forth, because of characteristics such as a point that the electrically driven hydraulic work machines do not emit an exhaust gas due to an engine and a point that they have low noise.

In patent document 1, an electrically driven hydraulic work machine is disclosed that includes, in addition to a built-in battery, a connector connected to a commercial power supply and a connector connected to an external battery, an AC-DC converter that converts AC power supplied from the connector connected to a commercial power supply to DC power and causes the DC power to merge into a line that supplies DC power from the built-in battery to an inverter for driving the electric motor, and a voltage adjuster that converts the voltage of DC power supplied from an external battery and causes the DC power to merge into the line that supplies DC power from the built-in battery to the inverter for driving the electric motor similarly to the above.

When the technique of patent document 1 is used, since including the connector connected to a commercial power supply and the connector connected to an external battery, the electrically driven hydraulic work machine can drive a hydraulic pump by using commercial AC power fed through the connector connected to a commercial power supply or DC power supplied through the connector connected to an external battery even if the situation in which the remaining charge of the built-in battery is insufficient in operation occurs. This enables continuous operation of the electrically driven hydraulic work machine and it is possible to avoid the situation in which the electrically driven hydraulic work machine becomes inoperable at a construction site due to depletion of the built-in battery.

PRIOR ART DOCUMENT

Patent Document

Patent Document 1: JP-2009-84838-A

SUMMARY OF THE INVENTION

Problem to be Solved by the Invention

However, also in patent document 1, there are the following problems.

For example, when a work implement (for example, front work implement of a hydraulic excavator) is operated in the state in which the remaining charge of the built-in battery has become low, the battery voltage suddenly lowers due to the electric power consumption of the electric motor that drives the hydraulic pump and the battery voltage falls below the allowable range of the inverter that drives the electric motor, and thus the electrically driven hydraulic work machine suddenly stops, in some cases.

Also in the case in which the electrically driven hydraulic work machine is operating by a commercial power supply through the connector connected to the commercial power supply, the electric power consumption (or current) of the electric motor that drives the hydraulic pump exceeds the power capacity (or current capacity) of the commercial power supply and a breaker included in the commercial power supply carries out interrupt operation, and thus the electrically driven hydraulic work machine suddenly stops operation and the work implement suddenly stops, in some cases.

When the work implement of the electrically driven hydraulic work machine suddenly stops in operation as above, there are the case in which the stability of the work machine is impaired and a possibility of falling-down occurs, the case in which the inverter and the breaker need to be returned each time for example, that is, the convenience of the operator is impaired, and so forth.

An object of the present invention is to provide an electrically driven hydraulic work machines that drive a hydraulic pump by an electric motor to carry out work, and in which the power consumption of the electric motor is prevented from exceeding a value decided in advance when the power to be consumed by the hydraulic pump increases and a sudden stop of a work implement that occurs due to abnormal lowering of the voltage of a built-in battery and operation of a breaker of a commercial power supply can be surely prevented.

Means for Solving the Problem

In order to solve such a problem, the present invention provides an electrically driven hydraulic work machine comprising an electric motor, a hydraulic pump driven by the electric motor, and a controller that controls the revolution speed of the electric motor on the basis of a target revolution speed of the electric motor, and drives the hydraulic pump to carry out work, wherein the electrically driven hydraulic work machine further comprises a maximum allowable power setting device that sets maximum allowable power allowed to be consumed by the electric motor, and a pressure sensor that senses a delivery pressure of the hydraulic pump, and the controller is configured to calculate target power to be consumed by the hydraulic pump on the basis of the capacity of the hydraulic pump, the delivery pressure of the hydraulic pump sensed by the pressure sensor, and the target revolution speed of the electric motor and control the target revolution speed of the electric motor in such a manner that the target power falls within a range of the maximum allowable power.

Advantages of the Invention

According to the present invention, the power consumed by the electric motor is surely limited to be equal to or lower than the maximum allowable power. This prevents abnormal lowering of the voltage of a built-in battery that supplies electric power to the electric motor and operation of a breaker of a commercial power supply to the interruption position in operation of the electrically driven hydraulic work machine and can surely prevent a sudden stop of a work implement.

MODES FOR CARRYING OUT THE INVENTION

Embodiments of the present invention will be described below according to the drawings.

First Embodiment

—Configuration—

Figure 1:
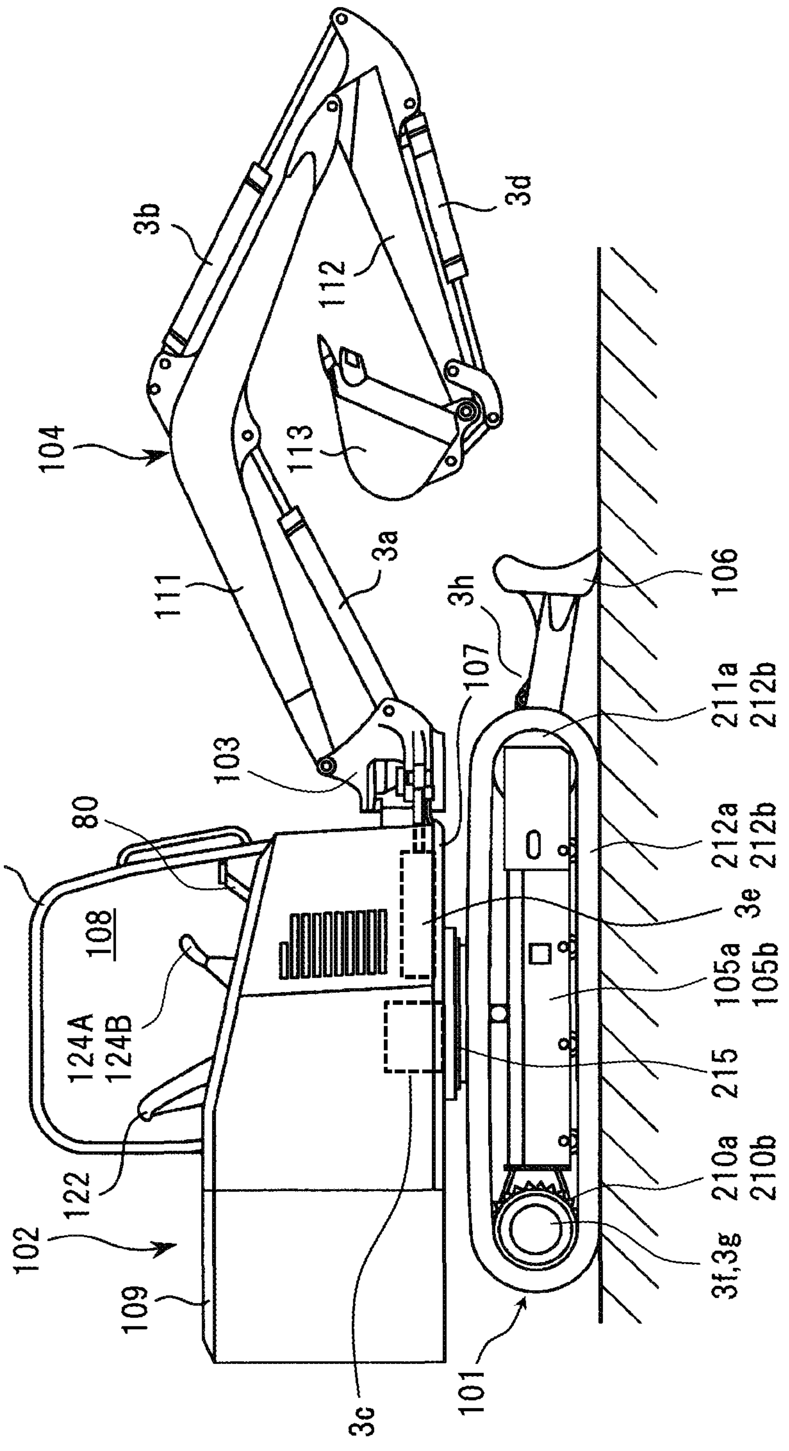
FIG. 1 is a diagram illustrating the appearance of an electrically driven hydraulic work machine in a first embodiment.

FIG. 1 is a diagram illustrating the appearance of an electrically driven hydraulic work machine in a first embodiment of the present invention.

The electrically driven hydraulic work machine includes a lower track structure 101, an upper swing structure 102, and a front work implement 104 of a swing type, and the front work implement 104 is composed of a boom 111, an arm 112, and a bucket 113. The upper swing structure 102 and the lower track structure 101 are rotatably connected to each other by a swing ring 215 and the upper swing structure 102 can swing relative to the lower track structure 101 by rotation of a swing motor 3*c*. A swing post 103 is attached to the front part of the upper swing structure 102 and the front work implement 104 is attached to this swing post 103 vertically movably. The swing post 103 can be pivoted in the horizontal direction relative to the upper swing structure 102 by extension and contraction of a swing cylinder 3*e*. The boom 111, the arm 112, and the bucket 113 of the front work implement 104 can be pivoted in the upward-downward direction by extension and contraction of a boom cylinder 3*a*, an arm cylinder 3*b*, and a bucket cylinder 3*d*. To a center frame of the lower track structure 101, right and left track devices 105*a* and 105*b* and a blade 106 that carries out upward-downward operation by extension and contraction of a blade cylinder 3*h* are attached. The right and left track devices 105*a* and 105*b* include drive wheels 210*a* and 210*b*, idlers 211*a* and 211*b*, and crawlers 212*a* and 212*b*, respectively, and carry out travelling by driving the crawlers 212*a* and 212*b* through the drive wheels 210*a* and 210*b* by rotation of right and left travelling motors 3*f* and 3*g*.

In the upper swing structure 102, a battery mounting part 109 in which a battery 70 is mounted on a swing frame 107 and a cabin 110 inside which an operation room 108 is formed are set. In the operation room 108, an operation seat 122, right and left operation lever devices 124A and 124B for the boom cylinder 3*a*, the arm cylinder 3*b*, the bucket cylinder 3*d*, and the swing motor 3*c*, a monitor 80, and a gate lock lever 24 (see FIG. 2) are disposed.

Figure 2:
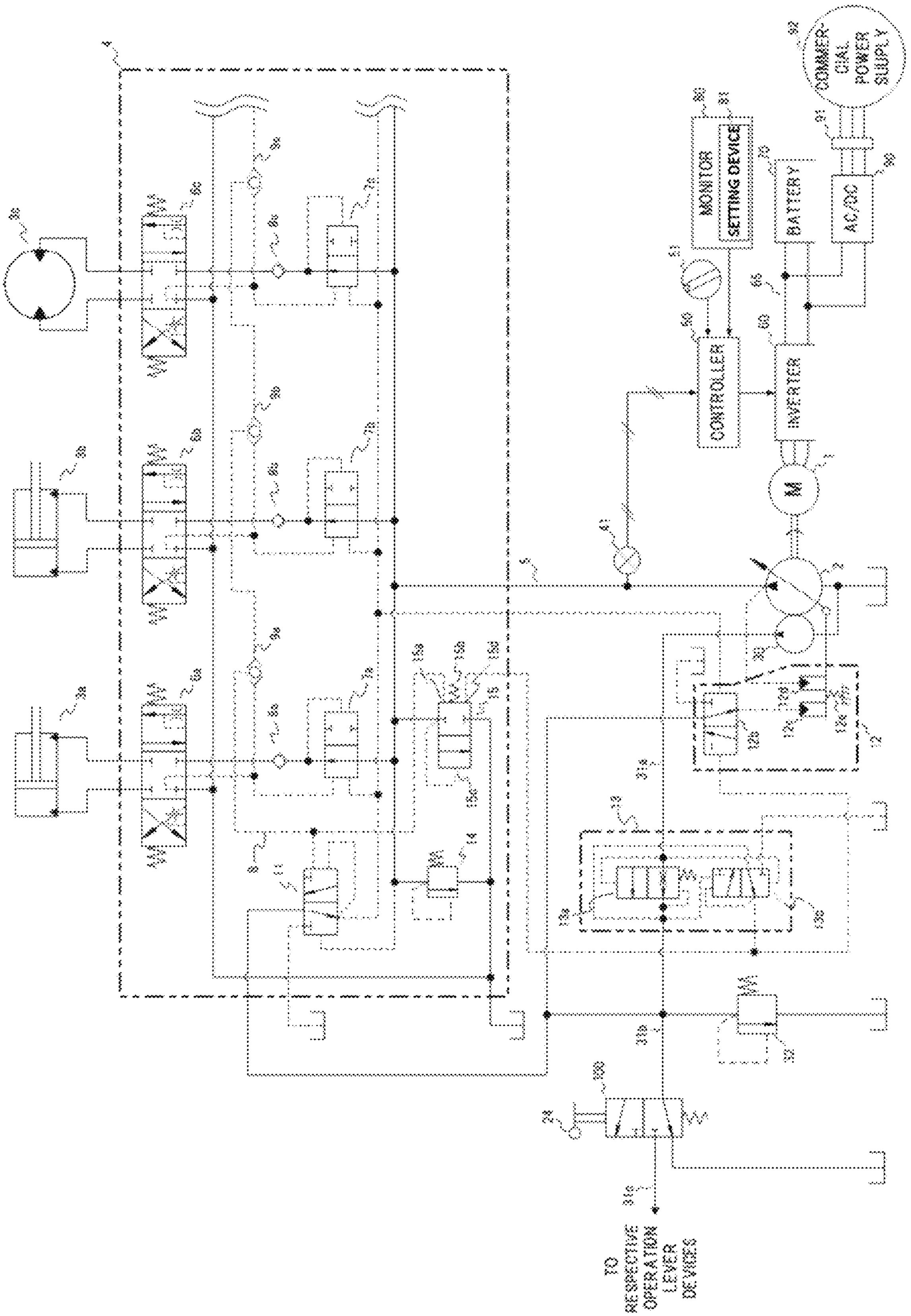
FIG. 2 is a diagram illustrating a hydraulic drive system included in the electrically driven hydraulic work machine in the first embodiment.

FIG. 2 is a diagram illustrating a hydraulic drive system included in the electrically driven hydraulic work machine in the first embodiment.

The hydraulic drive system includes an electric motor 1, a main hydraulic pump (hereinafter, referred to as main pump) 2 of the variable displacement type driven by the electric motor 1, and a pilot pump 30 of the fixed displacement type. The hydraulic drive system includes also the boom cylinder 3*a*, the arm cylinder 3*b*, the swing motor 3*c*, the bucket cylinder 3*d* (see FIG. 1), the swing cylinder 3*e* (see FIG. 1), the travelling motors 3*f* and 3*g* (see FIG. 1), and the blade cylinder 3*h* (see FIG. 1) that are plural actuators driven by a hydraulic fluid delivered from the main pump 2. The hydraulic drive system includes also a hydraulic fluid supply line 5 for introducing the hydraulic fluid delivered from the main pump 2 to the plural actuators 3*a*, 3*b*, 3*c*, 3*d*, 3*e*, 3*f*, 3*g*, and 3*h* and a control valve block 4 that is connected to the downstream side of the hydraulic fluid supply line 5 and to which the hydraulic fluid delivered from the main pump 2 is introduced. Hereinafter, the "actuators 3*a*, 3*b*, 3*c*, 3*d*, 3*e*, 3*f*, 3*g*, and 3*h*" will be represented with simplification to the "actuators 3*a*, 3*b*, 3*c* . . . ."

The control valve block 4 is a control valve device that distributes and supplies the hydraulic fluid delivered from the main pump 2 to the plural actuators 3*a*, 3*b*, 3*c* . . . . In the control valve block 4, plural directional control valves 6*a*, 6*b*, 6*c* . . . for controlling the plural actuators 3*a*, 3*b*, 3*c* . . . and plural pressure compensating valves 7*a*, 7*b*, 7*c* . . . each located on the downstream side of the respective meter-in openings of the plural directional control valves 6*a*, 6*b*, 6*c* . . . are disposed. To the plural pressure compensating valves 7*a*, 7*b*, 7*c* . . . , the pressure of the upstream side of the meter-in openings of the directional control valves 6*a*, 6*b*, 6*c* . . . is introduced in such a direction as to bias a spool of the pressure compensating valves 7*a*, 7*b*, 7*c* . . . in the closing direction and the load pressure of the actuators 3*a*, 3*b*, 3*c* . . . and the output pressure of a differential pressure reducing valve 11 to be described later are introduced in such a direction as to bias the spool in the opening direction. Between the pressure compensating valves 7*a*, 7*b*, 7*c* . . . and the directional control valves 6*a*, 6*b*, 6*c* . . . , check valves 8*a*, 8*b*, 8*c* . . . that each prevent backflow of the hydraulic fluid from the directional control valve 6*a*, 6*b*, 6*c* . . . to the pressure compensating valve 7*a*, 7*b*, 7*c* . . . are disposed.

Furthermore, in the control valve block 4, shuttle valves 9*a*, 9*b*, 9*c* . . . connected to load pressure sensing ports of the plural directional control valve 6*a*, 6*b*, 6*c* . . . are disposed. The shuttle valves 9*a*, 9*b*, 9*c* . . . are connected into a tournament format and the highest load pressure is sensed by the shuttle valve 9*a* of the highest level and is output to a hydraulic line 8.

Moreover, in the control valve block 4, on the downstream side of the hydraulic fluid supply line 5, a main relief valve 14 that discharges the hydraulic fluid of the hydraulic fluid supply line 5 to a tank when the pressure of the hydraulic fluid supply line 5 (delivery pressure of the main pump 2) has become equal to or higher than a set pressure decided in advance, the differential pressure reducing valve 11 that outputs the differential pressure between the pressure (delivery pressure of the main pump 2) Pps of the hydraulic fluid supply line 5 and a highest load pressure Pplmax to be described later as an absolute pressure Pls (=Pps−Pplmax), and an unloading valve 15 that discharges the hydraulic fluid of the hydraulic fluid supply line 5 to the tank when the differential pressure between the pressure (delivery pressure of the main pump 2) Pps of the hydraulic fluid supply line 5 and the highest load pressure Pplmax has become equal to or higher than a certain set pressure (unloading differential pressure) are disposed. The unloading valve 15 has pressure receiving parts 15*a* and 15*d* and a spring 15*b* that bias a spool of the unloading valve 15 in the closing direction and a pressure receiving part 15*c* that biases the spool in the opening direction. The highest load pressure Pplmax of the plural actuators 3*a*, 3*b*, 3*c* . . . is introduced to the pressure receiving part 15*a*. An output pressure Pgr (target LS differential pressure) of a prime mover revolution speed sensing valve 13 to be described later is introduced to the pressure receiving part 15*d*. The pressure (delivery pressure of the main pump 2) Pps of the hydraulic fluid supply line 5 is introduced to the pressure receiving part 15*c*. The unloading differential pressure of the unloading valve 15 is set based on the spring constant of the spring 15*b* and the output pressure of the prime mover revolution speed sensing valve 13 (target LS differential pressure Pgr) introduced to the pressure receiving part 15*d*.

The main pump 2 of the variable displacement type has a regulator 12 and the regulator 12 includes a torque control piston 12*d* to which the pressure (delivery pressure of the main pump 2) Pps of the hydraulic fluid supply line 5 is introduced and that controls the capacity (tilting angle) of the main pump 2 in such a manner that the absorption torque of the main pump 2 does not exceed a predetermined value set based on a spring 12*e*.

Figure 3:
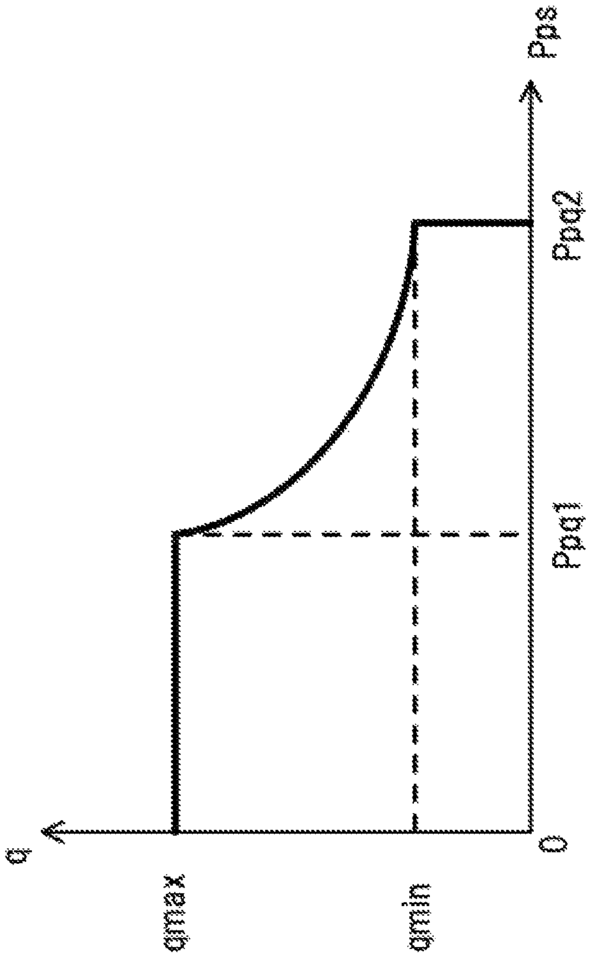
FIG. 3 is a diagram illustrating the absorption torque characteristic of a main pump 2 controlled by a torque control piston 12*d*.

FIG. 3 is a diagram illustrating the absorption torque characteristic of the main pump 2 controlled by the torque control piston 12*d*. In FIG. 3, the abscissa axis is the delivery pressure Pps of the main pump 2 and the ordinate axis is capacity q (tilting angle) of the main pump 2.

Until the delivery pressure Pps of the main pump 2 rises to Ppq1, the capacity q of the main pump 2 is equal to a maximum capacity qmax that depends on specifications of the main pump 2. When the delivery pressure Pps has risen to Ppq1 or higher, the capacity q gradually becomes lower from the maximum capacity qmax as the delivery pressure Pps rises. When the delivery pressure Pps reaches Ppq2, the capacity q becomes equal to qmin. While the delivery pressure is in the range from Ppq1 to Ppq2, the absorption torque of the main pump 2 is kept at the predetermined value set based on the spring 12*e*. Ppq2 is the maximum pressure that depends on the set pressure of the main relief valve 14.

Furthermore, the regulator 12 includes a flow rate control piston 12*c* that controls the delivery flow rate of the main pump 2 and an LS valve 12*b* that switches whether to introduce a constant pilot pressure Pi0 generated by a pilot relief valve 32 to be described later to the flow rate control piston 12*c* or to discharge the pressure of the flow rate control piston 12*c* to the tank.

To the LS valve 12*b*, the output pressure Pls of the differential pressure reducing valve 11 is introduced in such a direction as to carry out switching to introduce the constant pilot pressure Pi0 to the flow rate control piston 12*c* and the output pressure Pgr (target LS differential pressure) of the prime mover revolution speed sensing valve 13 is introduced in such a direction as to carry out switching to discharge the hydraulic fluid of the flow rate control piston 12*c* to the tank. The LS valve 12*b* and the flow rate control piston 12*c* control the capacity of the main pump 2 in such a manner that the pressure (delivery pressure of the main pump 2) Pps of the hydraulic fluid supply line 5 becomes higher than the highest load pressure Plmax of the actuator driven by the hydraulic fluid delivered from the main pump 2 by the output pressure Pgr (target LS differential pressure) of the prime mover revolution speed sensing valve 13.

The prime mover revolution speed sensing valve 13 is disposed on a pilot pressure supply line 31*a* of the pilot pump 30 and senses the revolution speed of the electric motor 1 from the delivery flow rate of the pilot pump 30. The prime mover revolution speed sensing valve 13 has a flow rate sensing valve 13*a* connected between the hydraulic fluid supply line 31*a* of the pilot pump 30 and a pilot hydraulic pressure supply line 31*b* and a differential pressure reducing valve 13*b* that outputs the differential pressure across the flow rate sensing valve 13*a* as the target LS differential pressure Pgr. On the pilot pressure supply line 31*b* on the downstream side of the prime mover revolution speed sensing valve 13, the pilot relief valve 32 that keeps the pressure of the pilot pressure supply line 31*b* constant and forms a pilot hydraulic fluid source on the pilot pressure supply line 31*b* and a selector valve 100 that switches whether or not to supply the pressure of the pilot pressure supply line 31*b* to plural pilot valves (pressure reducing valves) that are for actuating the plural directional control valves 6*a*, 6*b*, 6*c* . . . and are not illustrated in the diagram are disposed. The plural pilot valves are each incorporated in plural operation lever devices including the operation lever devices 124A and 124B (see FIG. 1) for the boom cylinder 3*a*, the arm cylinder 3*b*, the bucket cylinder 3*d*, and the swing motor 3*c*, and are actuated by operating the operation lever of the corresponding operation lever device to generate an operation pilot pressure for actuation of the plural directional control valves 6*a*, 6*b*, 6*c* . . . with use of the hydraulic fluid introduced from the pilot pressure supply line 31*b* via a pilot pressure supply line 31*c* as a pilot primary pressure.

For the selector valve 100, the above-described gate lock lever 24 for switching whether or not to permit operation of the operation lever of the operation lever device is disposed. In the selector valve 100, through operation of the gate lock lever 24 by the operator in the operation room 108 (see FIG. 1), whether the pressure of the pilot pressure supply line 31*b* is supplied to the plural pilot valves (not illustrated) as the pilot primary pressure or the pilot primary pressure supplied to the pilot valves is discharged to the tank is switched.

Next, characteristic configurations of the electrically driven hydraulic work machine in the present embodiment will be described.

In the present embodiment, the main pump 2 is a hydraulic pump driven by the electric motor 1 and the electrically driven hydraulic work machine is an electrically driven hydraulic work machine that drives the main pump 2 to carry out work. Furthermore, the electrically driven hydraulic work machine includes a controller 50 that controls the revolution speed of the electric motor 1 on the basis of a target revolution speed of the electric motor 1. The controller 50 calculates target power to be consumed by the main pump 2 on the basis of the capacity of the main pump 2 (hydraulic pump), the delivery pressure of the main pump 2 sensed by a pressure sensor 41, and the target revolution speed set in advance regarding the electric motor 1, and limits the target revolution speed of the electric motor 1 in such a manner that the target power falls within a range of the maximum allowable power. Details thereof will be described below.

In the present embodiment, the hydraulic drive system includes an inverter 60 for controlling the revolution speed of the electric motor 1 and a battery 70 connected so as to supply DC power to the inverter 60 through a DC power supply line 65. Furthermore, the hydraulic drive system includes an AC/DC converter 90 connected to the DC power supply line 65 and a connector 91 connected to the AC/DC converter 90 and is configured to allow DC power to be supplied to the inverter 60 through the connector 91 and the AC/DC converter 90 on the basis of AC power supplied from a commercial power supply 92 when the commercial power supply 92 is connected to the connector 91.

Moreover, the hydraulic drive system includes a target revolution speed instruction dial (target revolution speed instruction device) 51 to make an instruction of the target revolution speed of the electric motor 1, a monitor 80 in which a maximum allowable power setting device 81 that sets the maximum allowable power that can be consumed by the electric motor 1 is incorporated, and the pressure sensor 41 that is connected to the hydraulic fluid supply line 5 and senses the pressure of the hydraulic fluid supply line 5 as the delivery pressure Pps of the main pump 2. The output of the pressure sensor 41, the output of the target revolution speed instruction dial 51, and the output of the maximum allowable power setting device 81 are each introduced to the controller 50. The controller 50 outputs the target revolution speed of the electric motor 1 to the inverter 60 as a command revolution speed.

In the maximum allowable power setting device 81 incorporated in the monitor 80, plural values of the maximum allowable power corresponding to the power supply that supplies electric power to the electric motor 1 are stored according to the kinds of power supply. The maximum allowable power setting device 81 is configured to select what corresponds to the battery 70 and the commercial power supply 92 that are the power supplies that supply electric power to the electric motor 1 from the stored values of the maximum allowable power and set the maximum allowable power. For example, current values are stored as the maximum allowable power.

Figure 4:
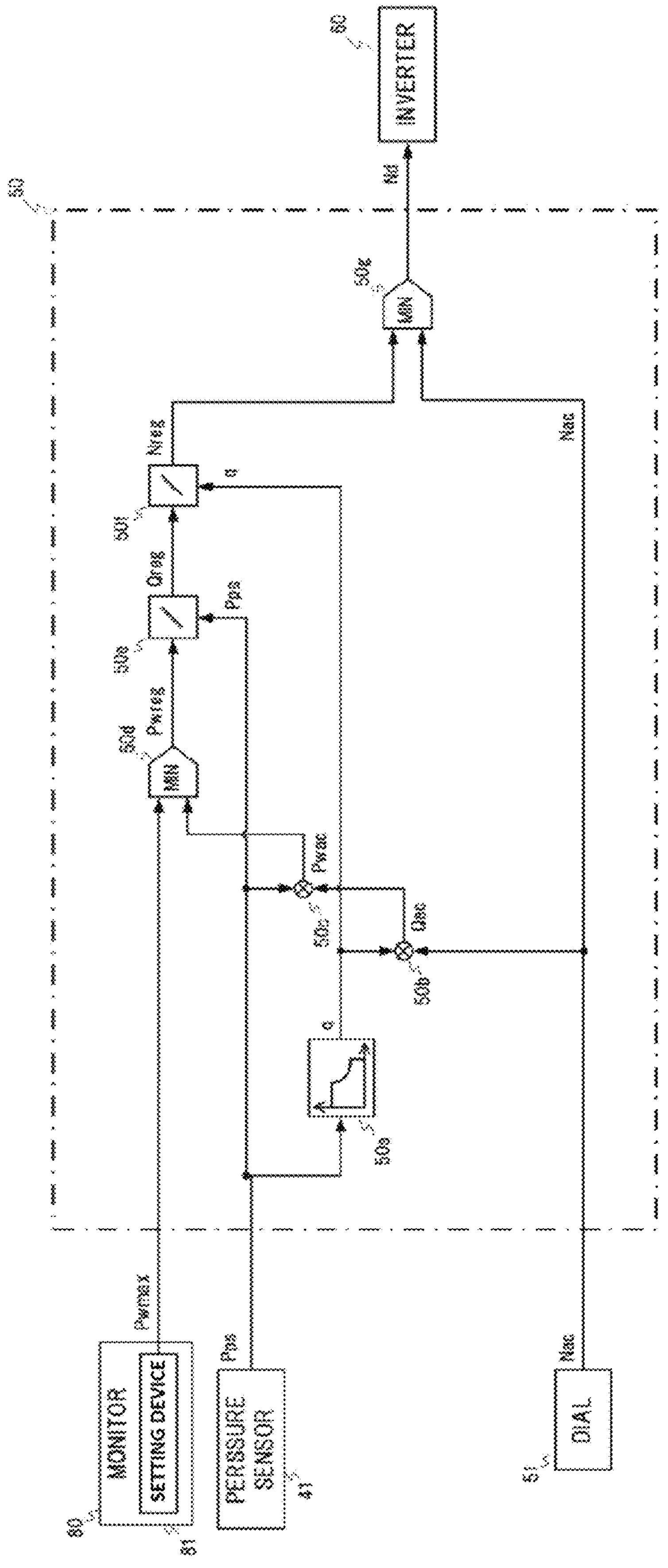
FIG. 4 is a functional block diagram of a controller 50 in the first embodiment.

FIG. 4 is a functional block diagram of the controller 50 in the first embodiment.

In FIG. 4, the controller 50 has, as processing functions thereof, a table 50*a*, a multiplying section 50*b*, a multiplying section 50*c*, a minimum value selecting section 50*d*, a dividing section 50*e*, a dividing section 50*f*, and a minimum value selecting section 50*g*.

In the table 50*a*, the same characteristic as the absorption torque characteristic (see FIG. 3) of the main pump 2 controlled by the torque control piston 12*d* of the above-described regulator 12 is set. The delivery pressure Pps of the main pump 2 that is an output from the pressure sensor 41 is introduced to the table 50*a*. Reference to the delivery pressure Pps of the main pump 2 is made in the table 50*a* and the capacity q of the main pump 2 is calculated.

Figure 7:
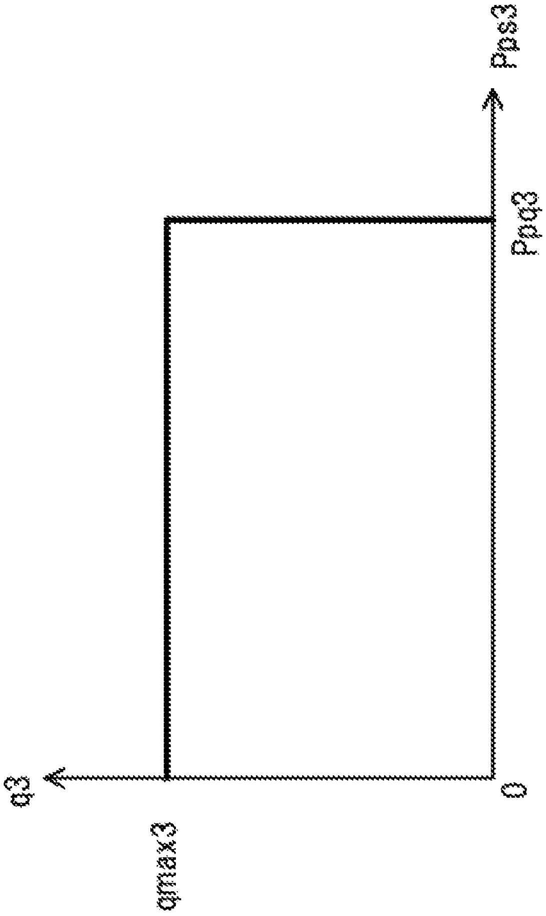
FIG. 7 is a diagram illustrating the absorption torque characteristic of a main pump of the fixed displacement type.

The main pump 2 may be the fixed displacement type. In this case, like a hydraulic pump 21 in a second embodiment to be described later, a table in which constant capacity qmax like one illustrated in FIG. 7 is set is prepared, and the capacity can be calculated from the delivery pressure of the main pump at the time. Furthermore, the constant capacity qmax may be stored in a memory of the controller 50 and the capacity qmax may be used.

A target revolution speed Nac that is an input from the target revolution speed instruction dial 51 is introduced to the multiplying section 50*b* together with the capacity q calculated with the table 50*a* and a target flow rate Qac is calculated. This target flow rate Qac and the delivery pressure Pps of the main pump 2 that is the output from the pressure sensor 41 are introduced to the multiplying section 50*c* and target power Pwac is calculated.

Moreover, maximum allowable power Pwmax that is an output from the maximum allowable power setting device 81 incorporated in the monitor 80 and the target power Pwac calculated in the multiplying section 50*c* are introduced to the minimum value selecting section 50*d* and post-limiting power Pwreg is calculated. The post-limiting power Pwreg and the delivery pressure Pps of the main pump 2 that is the output from the pressure sensor 41 are introduced to the dividing section 50*e* and a post-limiting flow rate Qreg is calculated. The post-limiting flow rate Qreg and the capacity q calculated with the table 50*a* are introduced to the dividing section 50*f* and a post-limiting revolution speed Nreg is calculated.

The post-limiting revolution speed Nreg and the target revolution speed Nac that is the input from the target revolution speed instruction dial 51 are input to the minimum value selecting section 50*g* and the smaller value of the post-limiting revolution speed Nreg and the target revolution speed Nac is selected as a command revolution speed Nd and is output to the inverter 60.

As above, the controller 50 calculates the first target revolution speed (post-limiting revolution speed) Nreg of the electric motor 1 on the basis of the post-limiting power Pwreg that is the lower power of the target power Pwac and the maximum allowable power Pwmax set by the maximum allowable power setting device 81, and selects the lower target revolution speed of this first target revolution speed Nreg and the target revolution speed Nac of the electric motor 1 regarding which an instruction is made by the target revolution speed instruction device (target revolution speed instruction dial) 51 as the second target revolution speed (command target revolution speed) Nd and controls the revolution speed of the electric motor 1 on the basis of the second target revolution speed Nd.

—Operation—

Operation of the first embodiment will be described.

The hydraulic fluid delivered from the pilot pump 30 of the fixed displacement type is supplied to the pilot pressure supply line 31*a* and the prime mover revolution speed sensing valve 13 outputs the target LS differential pressure Pgr according to the delivery flow rate of the pilot pump 30. The pilot primary pressure generated by the pilot relief valve 32 is supplied to the respective pilot valves of the plural operation lever devices including the operation lever devices 124A and 124B through the selector valve 100 actuated to be switched by the gate lock lever.

When the operation lever of an optional operation lever device in the plural operation lever devices including the operation lever devices 24A and 124B (see FIG. 1) is operated, the corresponding pilot valve is actuated and the corresponding directional control valve is switched, and thus the hydraulic fluid is supplied to the corresponding actuator. At this time, the directional control valve is switched with a stroke according to the operation amount of the operation lever and the main pump 2 driven by the electric motor 1 delivers a flow rate according to the operation amount of the operation lever on the basis of load sensing control by the LS valve 12*b* and the flow rate control piston 12*c* of the regulator 12. The actuator is driven at a speed according to the operation amount of the operation lever.

In the present embodiment, the flow rate control of the main pump 2 by the LS valve 12*b* and the flow rate control piston 12*c* is general load sensing control. Therefore, details thereof are omitted.

DC power supplied from the battery 70 or DC power supplied after being converted from AC power by the AC/DC converter 90 from the commercial power supply 92 through the connector 91 or the DC power of both is supplied to the inverter 60 that drives the electric motor 1 through the DC power supply line 65.

The maximum allowable power Pwmax set in advance is input to the controller 50 from the maximum allowable power setting device 81 incorporated in the monitor 80.

The output from the pressure sensor 41 as the pump delivery pressure Pps and the output from the target revolution speed instruction dial 51 as the target revolution speed Nac are each input to the controller 50.

Processing in the controller 50 will be described below with classification of cases.

(a) Case in which the Target Power Pwac of the Main Pump 2 is the Same as or Lower than the Maximum Allowable Power Pwmax (Pwac≤Pwmax)

The maximum allowable power Pwmax and the target power Pwac are introduced to the minimum value selecting section 50*d* and Pwac that is the minimum value is selected, and thus the post-limiting power Pwreg becomes Pwreg=Pwac.

In the dividing section 50*e*, Pwreg/Pps is computed. At this time, Pwreg=Pwac holds in the case of Pwac≤Pwmax. Therefore, the post-limiting flow rate Qreg becomes Qreg=Pwreg/Pps=Pwac/Pps=Qac.

In the dividing section 50*f*, Qreg/q is computed. At this time, Qreg=Qac holds as described above. Therefore, the post-limiting revolution speed Nreg becomes Nreg=Qreg/q=Qac/q=Nac.

The post-limiting revolution speed Nreg and the target revolution speed Nac are input to the minimum value selecting section 50*g* and the minimum value is selected. At this time, Nreg=Nac holds as described above. Therefore, the command revolution speed Nd output from the controller 50 to the inverter 60 becomes Nd=Nac without being limited by the minimum value selecting section 50*g*.

(b) Case in which the Target Power Pwac of the Main Pump 2 is Higher than the Maximum Allowable Power Pwmax (Pwac>Pwmax)

The maximum allowable power Pwmax and the target power Pwac are each introduced to the minimum value selecting section 50*d*. In this case, the maximum allowable power Pwmax is selected as the minimum value and the post-limiting power Pwreg becomes Pwreg=Pwmax.

The post-limiting flow rate Qreg is calculated as Qreg=Pwmax/Pps by the dividing section 50*e*. At this time, since originally a relation of Qac=Pwac/Pps holds, a relation of Qreg/Qac=Pwmax/Pwac (<1) holds from these two expressions.

Subsequently, the post-limiting revolution speed Nreg is calculated as Nreg=Qreg/q=Pwmax/Pps/q by the dividing section 50*f*. Also in this case, since originally a relation of Nac=Qac/q holds, a relation of Nreg/Nac=Qreg/Qac=Pwmax/Pwac (<1) holds from these two expressions.

The post-limiting revolution speed Nreg and the target revolution speed Nac are input to the minimum value selecting section 50*g*. At this time, since Nreg<Nac holds as described above, Nreg that is the smaller value than the target revolution speed Nac is selected as the command revolution speed Nd and is output from the controller 50 to the inverter 60.

—Effects—

In the present embodiment, the following effects are obtained.

1. The controller 50 calculates the target power Pwac to be consumed by the main pump 2 on the basis of the capacity q of the main pump 2, the delivery pressure Pps of the main pump 2 sensed by the pressure sensor 41, and the target revolution speed Nac of the electric motor 1 and outputs the command revolution speed Nd to the inverter 60 to limit the target revolution speed Nac of the electric motor 1 in such a manner that the target power Pwac falls within the range of the maximum allowable power Pwmax. Therefore, the power consumption of the electric motor 1 is surely limited to be equal to or lower than the maximum allowable power Pwmax. This prevents abnormal lowering of the voltage of the battery 70 that supplies electric power to the electric motor 1 and operation of the breaker of the commercial power supply 92 to the interruption position in operation of the electrically driven hydraulic work machine and can surely prevent a sudden stop of the front work implement 104.

2. Furthermore, without manual operation of the target revolution speed instruction dial 51 by the operator, the target revolution speed Nac of the electric motor 1 is limited in such a manner that the power consumption of the electric motor 1 does not exceed the maximum allowable power Pwmax. Therefore, a sudden stop of the front work implement 104 that occurs due to abnormal lowering of the voltage of the battery 70 and operation of the breaker of the commercial power supply 92 is surely prevented. In addition, the lowering of the work efficiency can be suppressed to the minimum without lowering the operation speed of the front work implement 104 beyond necessity.

Specifically, in general, it is known that the electric power consumed by the electric motor of the electrically driven hydraulic work machine is almost equal to the power consumption of the hydraulic pump driven by the electric motor and is proportional to "delivery pressure"×"delivery flow rate," and the delivery flow rate is proportional to the revolution speed of the electric motor. Therefore, when the electric power consumption of the electric motor is desired to be suppressed, setting the instruction value of the target revolution speed instruction dial small by the operator is generally carried out. However, the operator oneself needs to learn how small the instruction value of the target revolution speed instruction dial is set in order to allow prevention of a stop of the electrically driven hydraulic work machine in operation while carrying out actual work. This is a cause of impairing the comfort of the operator due to troublesomeness thereof. Furthermore, when the instruction value of the target revolution speed instruction dial is set too small, the load of the hydraulic pump of the electrically driven hydraulic work machine is low and the operation speed of the work implement becomes low even when the revolution speed does not need to be suppressed to a low speed. This is a cause of lowering the work efficiency.

In the present embodiment, the controller 50 calculates the target power Pwac to be consumed by the main pump 2 on the basis of the capacity q of the main pump 2, the delivery pressure Pps of the main pump 2 sensed by the pressure sensor 41, and the target revolution speed Nac of the electric motor 1 regarding which an instruction is made by the target revolution speed instruction dial 51. Thus, the operator of the electrically driven hydraulic work machine does not need to operate the target revolution speed instruction dial 51 of the electric motor 1 to limit the revolution speed of the electric motor 1, and troublesomeness of operation can be eliminated.

Furthermore, the situation does not occur in which, when the target power of the electric motor 1 is low, the revolution speed of the electric motor 1 is unnecessarily limited and the operation speed of the front work implement 104 is lowered. Therefore, the lowering of the work efficiency of the electrically driven hydraulic work machine can be suppressed to the minimum.

3. The maximum allowable power setting device 81 is configured to select what corresponds to the battery 70 and the commercial power supply 92 that are power supplies that supply electric power to the electric motor 1 from plural values of the maximum allowable power stored in advance and set the maximum allowable power. Therefore, even an operator who is inexperienced in handling of the electrically driven hydraulic work machine can easily set the maximum allowable power.

4. The controller 50 sets the same characteristic as the absorption torque characteristic (see FIG. 4) of the main pump 2 in the table 50*a* and refers to the delivery pressure Pps of the main pump 2 sensed by the pressure sensor 1 in the table 50*a* to calculate the capacity q of the main pump 2. Therefore, it is possible to accurately calculate the absorption torque of the main pump 2 and surely prevent abnormal lowering of the voltage of the battery 70 that supplies electric power to the electric motor 1 and operation of the breaker of the commercial power supply 92 to the interruption position.

5. The controller 50 does not output, to the inverter 60, the post-limiting revolution speed (first target revolution speed) Nreg of the electric motor 1 calculated based on the post-limiting power Pwreg as the command revolution speed Nd as it is but outputs, to the inverter 60, the lower target revolution speed (second target revolution speed) of the post-limiting revolution speed Nreg and the target revolution speed Nac regarding which an instruction is made by the target revolution speed instruction dial 51 as the command revolution speed Nd to control the revolution speed of the electric motor 1. Therefore, when the target power Pwac of the main pump 2 is the same as or lower than the maximum allowable power Pwmax (Pwac≤Pwmax), stable revolution speed control of the electric motor 1 can be carried out without being affected by the processing speed or the responsiveness of the controller 50.

Second Embodiment

Regarding the second embodiment of the present invention, configuration, operation, and effects thereof will be described with focus on the different part from the first embodiment.

—Configuration—

Figure 5:
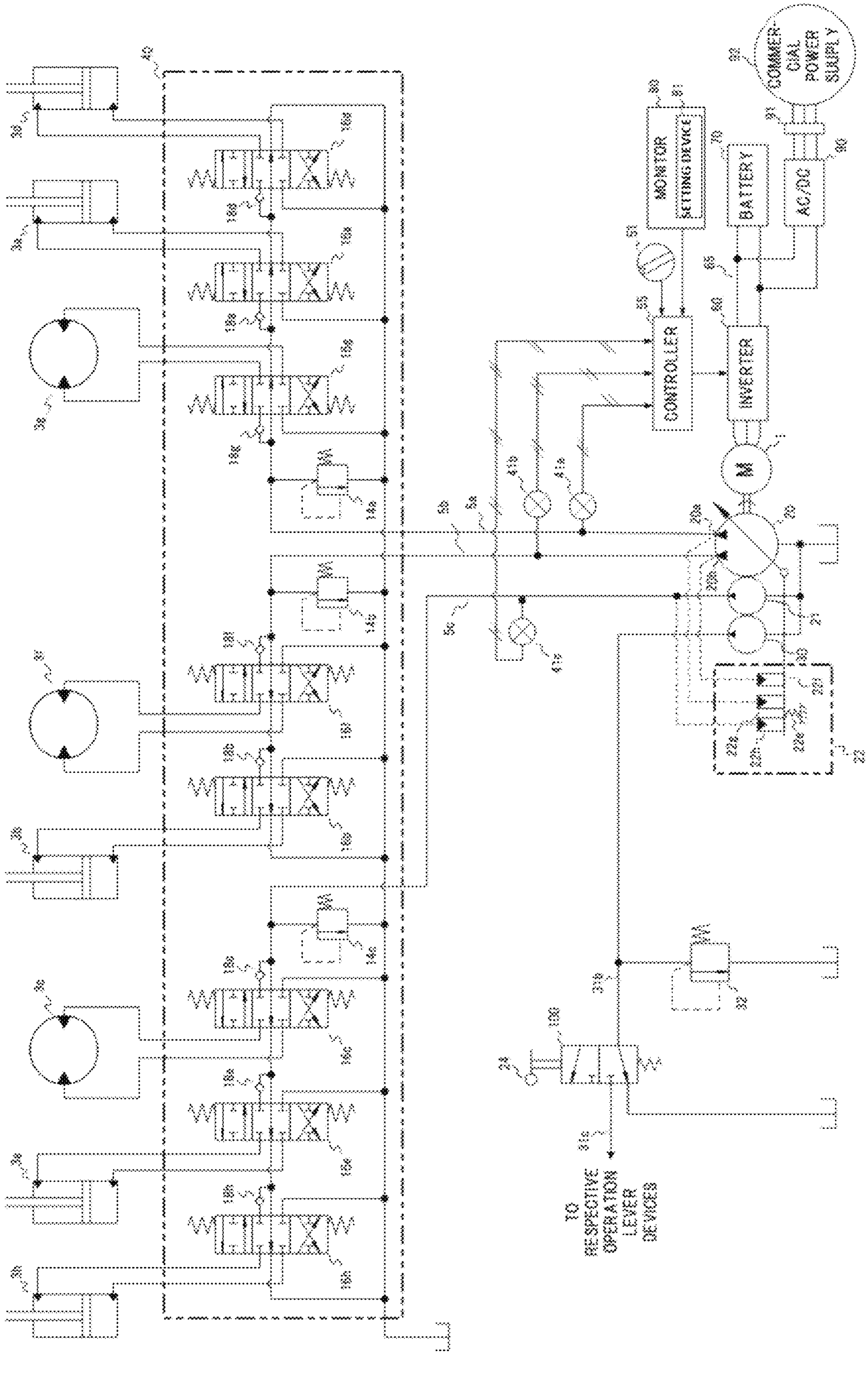
FIG. 5 is a diagram illustrating a hydraulic drive system included in an electrically driven hydraulic work machine of a second embodiment.

FIG. 5 is a diagram illustrating a hydraulic drive system included in an electrically driven hydraulic work machine of the second embodiment.

In the second embodiment, the hydraulic drive system is different from the first embodiment in that the hydraulic pump is a hydraulic pump for which flow rate control based on load sensing is not carried out and two hydraulic pumps (first and second hydraulic pumps) are included as the hydraulic pump, in that one of the two hydraulic pumps is the split-flow type and, corresponding thereto, three pressure sensors are included as pressure sensors that sense the delivery pressure of the hydraulic pumps, in that a control valve block is a control valve device including directional control valves of the open center type that do not carry out flow dividing control, and in that a regulator of the hydraulic pumps is configured to carry out total torque control (torque control in which, when plural hydraulic pumps exist, the capacity of one hydraulic pump is controlled in such a manner that the total of the absorption torque of the plural hydraulic pumps does not exceed a predetermined value).

In FIG. 5, the hydraulic drive system of the present embodiment includes a main hydraulic pump (first hydraulic pump) 20 of the variable displacement type that is a hydraulic pump of the split-flow type driven by the electric motor 1 and a main hydraulic pump (second hydraulic pump) 21 that is a hydraulic pump of the fixed displacement type. The main pump 20 of the split-flow type has two delivery ports 20*a* and 20*b* that deliver a hydraulic fluid pushed out from a common pumping mechanism including swash plate, piston, and so forth and the hydraulic fluid delivered from the delivery ports 20*a* and 20*b* is supplied to the respective directional control valves.

The main pump 20 may be a hydraulic pump having one delivery port. Furthermore, the main pump 20 may be two or more hydraulic pumps having one delivery port.

Moreover, the hydraulic drive system of the present embodiment includes a hydraulic fluid supply line 5*a* for introducing the hydraulic fluid delivered from one delivery port 20*a* of the main pump 20 to plural actuators 3*a*, 3*d*, and 3*g*, a hydraulic fluid supply line 5*b* for introducing the hydraulic fluid delivered from the other delivery port 20*b* of the main pump 20 to plural actuators 3*b* and 3*f*, a hydraulic fluid supply line 5*c* for introducing the hydraulic fluid delivered from the main pump 21 to plural actuators 3*c*, 3*e*, and 3*h*, and a control valve block 40 that is connected to the downstream side of the hydraulic fluid supply lines 5*a*, 5*b*, and 5*c* and to which the hydraulic fluid delivered from the main pumps 20 and 21 is introduced. The plural actuators 3*a*, 3*b*, 3*c*, 3*d*, 3*e*, 3*f*, 3*g*, and 3*h* are boom cylinder, arm cylinder, swing motor, bucket cylinder, swing cylinder, travelling motors, and blade cylinder, respectively, as described in the first embodiment.

The control valve block 40 is a control valve device that distributes and supplies the hydraulic fluid delivered from the main pumps 20 and 21 to the plural actuators 3*a*, 3*b*, 3*c*, 3*d*, 3*e*, 3*f*, 3*g*, and 3*h*. In the control valve block 40, plural directional control valves 16*a*, 16*b*, 16*c*, 16*d*, 16*e*, 16*f*, 16*g*, and 16*h* for controlling the plural actuators 3*a*, 3*b*, 3*c*, 3*d*, 3*e*, 3*f*, 3*g*, and 3*h* and main relief valves 14*a*, 14*b*, and 14*c* that are connected to the hydraulic fluid supply lines 5*a*, 5*b*, and 5*c* and discharge the hydraulic fluid of the hydraulic fluid supply lines 5*a*, 5*b*, and 5*c* to a tank when the pressure of the hydraulic fluid supply lines 5*a*, 5*b*, and 5*c* has become equal to or higher than a set pressure decided in advance are disposed. Between the hydraulic fluid supply lines 5*a*, 5*b*, and 5*c* and the plural directional control valves 16*a*, 16*b*, 16*c*, 16*d*, 16*e*, 16*f*, 16*g*, and 16*h*, check valves 18*a*, 18*b*, 18*c*, 18*d*, 18*e*, 18*f*, 18*g*, and 18*h* that each prevent backflow of the hydraulic fluid from the directional control valve 16*a*, 16*b*, 16*c*, 16*d*, 16*e*, 16*f*, 16*g*, or 16*h* to the hydraulic fluid supply line 5*a*, 5*b*, or 5*c* are disposed.

The main pump 20 of the variable displacement type has a regulator 22. The regulator 22 includes torque control pistons 22*f*, 22*g*, and 22*h* to which the pressures of the hydraulic fluid supply lines 5*a* and 5*b* (delivery pressures of the two delivery ports 20*a* and 20*b* of the main pump 20) and the hydraulic fluid of the hydraulic fluid supply line 5*c* are each introduced and that control the capacity (tilting angle) of the main pump 20 in such a manner that the total of the absorption torque of the main pump 20 and the absorption torque of the main pump 21 does not exceed a predetermined value set based on a spring 22*e*.

Figure 6:
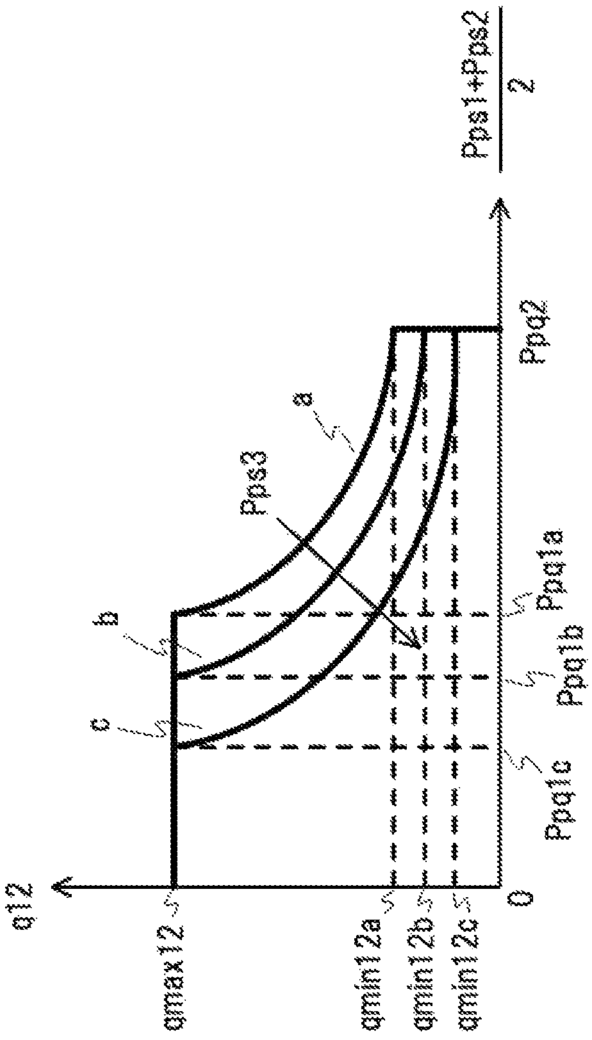
FIG. 6 is a diagram illustrating the absorption torque characteristic of a main pump controlled by torque control pistons.

FIG. 6 is a diagram illustrating the absorption torque characteristic of the main pump 20 controlled by the torque control pistons 22*f*, 22*g*, and 22*h*. In FIG. 6, the abscissa axis is an average delivery pressure (Pps1+Pps2)/2 of the main pump 20 and the ordinate axis is capacity q12 (tilting angle) of the main pump 20. Furthermore, Pps1 and Pps2 are the delivery pressures of the two delivery ports 20*a* and 20*b*, respectively, of the main pump 20 and Pps3 is the delivery pressure of the main pump 21.

The capacity q12 of the main pump 20, similarly to the absorption torque characteristic of the regulator 12 in the first embodiment illustrated in FIG. 3, is equal to a maximum capacity qmax12 that depends on specifications of the main pump 20 until the average delivery pressure (Pps1+Pps2)/2 of the main pump 20 rises to Ppq1*a*–Ppq1*c*. When the average delivery pressure (Pps1+Pps2)/2 has risen to Ppq1*a*–Ppq1*c* or higher, the capacity q12 gradually becomes lower from the maximum capacity qmax12 as the average delivery pressure (Pps1+Pps2)/2 rises. When the average delivery pressure (Pps1+Pps2)/2 reaches Ppq2, the capacity q12 becomes equal to qmin12*a*–qmin12*c*. While the average delivery pressure (Pps1+Pps2)/2 is in the range of Ppq1*a*–Ppq1*c* to Ppq2, the absorption torque of the main pump 20 is kept at the predetermined value set based on the spring 22*e*. Ppq2 is the maximum pressure that depends on the set pressure of the main relief valves 14*a* and 14*b*.

The characteristic between Ppq1*a*–Ppq1*c* to Ppq2 changes depending on the magnitude of the delivery pressure Pps3 of the main pump 21. The characteristic becomes a characteristic on a curve a when the value of the delivery pressure Pps3 is small, becomes a characteristic on a curve c when the value of the delivery pressure Pps3 is large, and becomes a characteristic on a curve b when the value of the delivery pressure Pps3 is in the middle.

The pilot pump 30 of the fixed displacement type is directly connected to the pilot pressure supply line 31*b* and the pilot relief valve 32 and the selector valve 100 are disposed on the pilot pressure supply line 31*b* similarly to the first embodiment.

FIG. 7 is a diagram illustrating the absorption torque characteristic of the main pump 21 of the fixed displacement type. In FIG. 7, the abscissa axis is the delivery pressure Pps3 of the main pump 21 and the ordinate axis is capacity q3 (tilting angle) of the main pump 21. Since the main pump 21 is the fixed displacement type, the capacity is constant at qmax3 irrespective of the value of the delivery pressure Pps3 of the main pump 21. Ppq3 is the maximum pressure that depends on the set pressure of the main relief valve 14*c*.

Furthermore, in the present embodiment, the hydraulic drive system includes a controller 55 that outputs a target revolution speed of the electric motor 1 to the inverter 60 as a command revolution speed, and includes pressure sensors 41*a* and 41*b* that are connected to the hydraulic fluid supply lines 5*a* and 5*b* and sense the delivery pressures Pps1 and Pps2 of the two delivery ports 20*a* and 20*b* of the main pump 20 and a pressure sensor 41*c* that is connected to the hydraulic fluid supply line 5*c* and senses the delivery pressure Pps3 of the main pump 21. The outputs of the pressure sensors 41*a*, 41*b*, and 41*c*, the output of the target revolution speed instruction dial 51, and the output of the maximum allowable power setting device 81 are each introduced to the controller 55.

Figure 8:
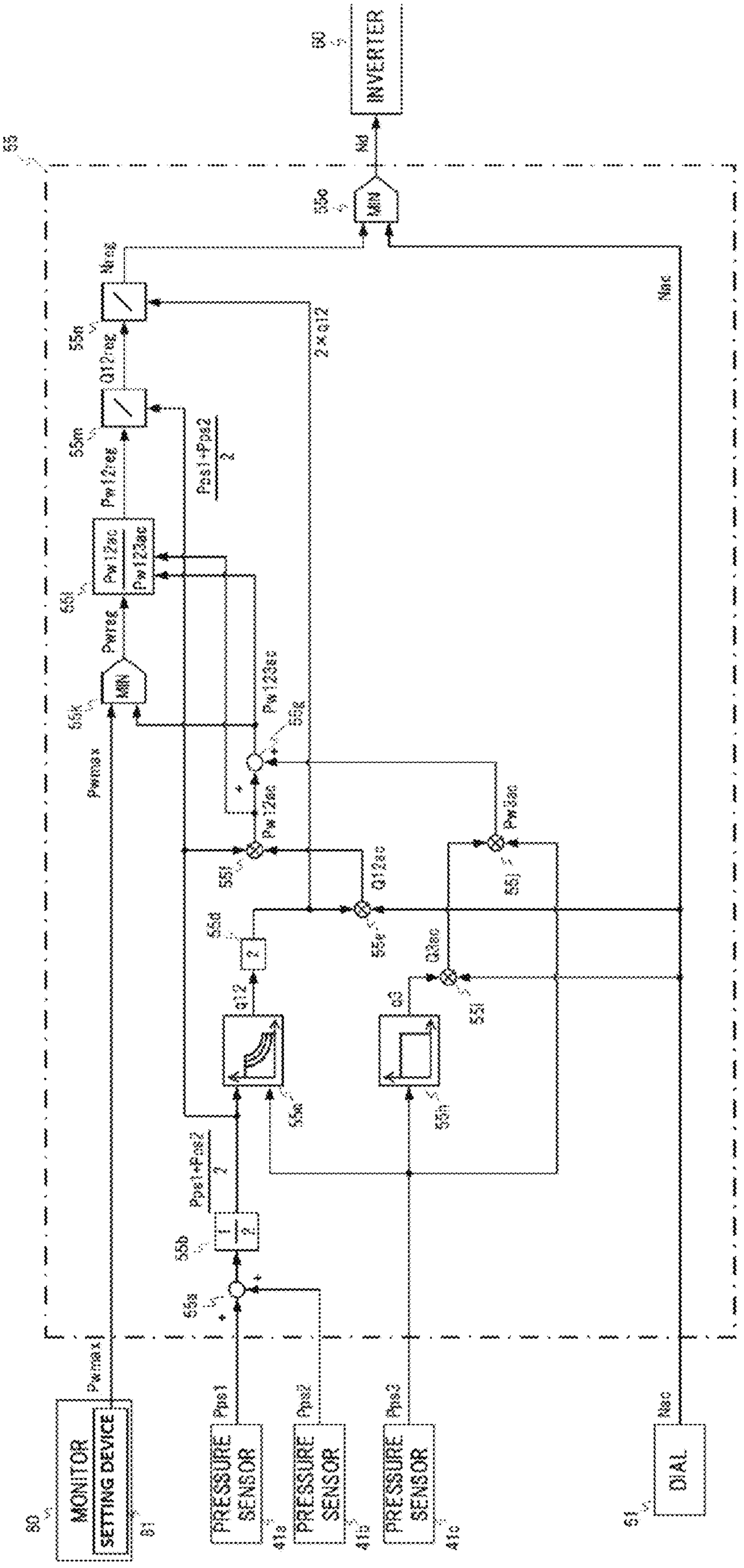
FIG. 8 is a functional block diagram of a controller 55 in the second embodiment.

FIG. 8 is a functional block diagram of the controller 55 in the second embodiment.

In FIG. 8, the controller 55 has, as processing functions thereof, an adding section 55*a*, a gain 55*b*, a table 55*c*, a gain 55*d*, a multiplying section 55*e*, a multiplying section 55*f*, an adding section 55*g*, a table 55*h*, a multiplying section 55*i*, a multiplying section 55*j*, a minimum value selecting section 55*k*, a gain 55*l*, a dividing section 55*m*, a dividing section 55*n*, and a minimum value selecting section 55*o*.

The delivery pressures Pps1 and Pps2 of the main pump 20 that are outputs from the pressure sensors 41*a* and 41*b* are introduced to the adding section 55*a* and the sum is turned to ½ by the gain 55*b*, and thus the average delivery pressure (Pps1+Pps2)/2 of the two delivery ports 20*a* and 20*b* of the main pump 20 is calculated. This average delivery pressure (Pps1+Pps2)/2 of the main pump 20 is introduced to the table 55*c*. Furthermore, the delivery pressure Pps3 of the main pump 21 that is an output from the pressure sensor 41*c* is introduced to the table 55*c*.

In the table 55*c*, the same characteristic as the absorption torque characteristic (FIG. 6) of the main pump 20 controlled by the torque control pistons 22*f*, 22*g*, and 22*h* of the above-described regulator 22 is set. The average delivery pressure (Pps1+Pps2)/2 of the main pump 20 and the delivery pressure Pps3 of the main pump 21 are introduced to the table 55*c*. Reference to the average delivery pressure (Pps1+Pps2)/2 of the main pump 20 and the delivery pressure Pps3 of the main pump 21 is made in the table 55*c* and the capacity q12 of the main pump 20 is calculated.

The capacity q12 of the main pump 20 calculated with the table 55*c* is doubled by the gain 55*d*.

Furthermore, the target revolution speed Nac that is an input from the target revolution speed instruction dial 51 is introduced to the multiplying section 55*e* together with the capacity q12*2 calculated with the gain 55*d* and a target flow rate Q12*ac* of the main pump 20 is calculated. The target flow rate Q12*ac* is the total of the delivery flow rates of two delivery ports 20*a* and 20*b* of the main pump 20. This target flow rate Q12*ac* and the average delivery pressure (Pps1+Pps2)/2 of the main pump 20 calculated with the gain 55*b* are introduced to the multiplying section 55*f* and target power Pw12*ac* of the main pump 20 is calculated.

Meanwhile, in the table 55*h*, the same characteristic as the absorption torque characteristic (see FIG. 7) of the above-described fixed displacement main pump 21 is set. The delivery pressure Pps3 of the main pump 21 that is the output from the pressure sensor 41*c* is introduced to the table 55*h*. Reference to the delivery pressure Pps3 of the main pump 21 is made in the table 55*h* and the capacity q3 of the main pump 21 is calculated. The table 55*h* outputs the constant value qmax3 as the capacity q3 irrespective of the value of the delivery pressure Pps3.

Since the capacity qmax3 is constant, instead of calculating the capacity qmax3 with use of the table 55*h*, the constant capacity qmax3 may be stored in a memory of the controller 55 and the capacity qmax3 may be used.

Furthermore, the target revolution speed Nac that is the input from the target revolution speed instruction dial 51 is introduced to the multiplying section 55*i* together with the capacity q3 calculated with the table 55*h* and a target flow rate Q3*ac* of the main pump 21 is calculated. This target flow rate Q3*ac* and the delivery pressure Pps3 of the main pump 21 that is the output from the pressure sensor 41*c* are introduced to the multiplying section 55*j* and target power Pw3*ac* of the main pump 21 is calculated.

The target power Pw12*ac* calculated in the multiplying section 55*f* and the target power Pw3*ac* calculated in the multiplying section 55*j* are added in the adding section 55*g* and total target power Pw123*ac* is calculated.

Maximum allowable power Pwmax that is an output from the maximum allowable power setting device 81 incorporated in the monitor 80 and the target power Pw123*ac* calculated in the adding section 55*g* are introduced to the minimum value selecting section 55*k* and post-limiting power Pwreg is calculated. The post-limiting power Pwreg that is an output from the minimum value selecting section 55*k* is introduced to the gain 55*l* and the post-limiting power Pwreg is multiplied by Pw12*ac*/Pw123*ac*, and thus post-limiting power Pw12*reg* that can be used by the main pump 20 is calculated. Pw12*ac*/Pw123*ac* represents the ratio of the target power Pw12*ac* of the main pump 20 of the variable displacement type calculated in the multiplying section 55*f* to the total target power Pw123*ac* of the main pump 20 of the variable displacement type and the main pump 21 of the fixed displacement type calculated in the adding section 55*g*. In other words, Pw12*ac*/Pw123*ac* represents the power that can be consumed by the main pump 20 of the variable displacement type in the power limited to the maximum allowable power Pwmax.

The post-limiting power Pw12*reg* and the average delivery pressure (Pps1+Pps2)/2 of the main pump 20 calculated with the gain 55*b* are introduced to the dividing section 55*m* and a post-limiting flow rate Q12*reg* is calculated. The post-limiting flow rate Q12*reg* and the capacity q12*2 calculated with the gain 55*d* are introduced to the dividing section 55*n* and a post-limiting revolution speed Nreg is calculated.

The post-limiting revolution speed Nreg and the target revolution speed Nac that is the input from the target revolution speed instruction dial 51 are input to the minimum value selecting section 55*o* and the smaller value of the post-limiting revolution speed Nreg and the target revolution speed Nac is selected as a command revolution speed Nd and is output to the inverter 60.

As above, in the present embodiment, the hydraulic drive system includes plural hydraulic pumps including the two main pumps 20 and 21 (first and second hydraulic pumps) and includes, as the pressure sensor, plural pressure sensors including the first pressure sensors 41*a* and 41*b* and the second pressure sensor 41*c* that sense the delivery pressure of each of the two main pumps 20 and 21. The controller 55 calculates the target power to be consumed by the two main pumps 20 and 21 (first and second hydraulic pumps) on the basis of the capacities of the two main pumps 20 and 21 (first and second hydraulic pumps), the delivery pressures of the two main pumps 20 and 21 sensed by the first pressure sensors 41*a* and 41*b* and the second pressure sensor 41*c*, and the target revolution speed of the electric motor 1.

Furthermore, the main pump 20 (first hydraulic pump) is the variable displacement type and the main pump 21 (second hydraulic pump) is the fixed displacement type. The main pump 20 (first hydraulic pump) has the regulator 22 including the first torque control pistons 22*f* and 22*g* and the second torque control piston 22*h* to which the delivery pressures of the main pump 20 and the delivery pressure of the main pump 21 (second hydraulic pump) are each introduced and that control the capacity of the main pump 20 in such a manner that the total of the absorption torque of the main pump 20 and the absorption torque of the main pump 21 does not exceed a predetermined value. In the table 55*c* of the controller 55, as the absorption torque characteristic of the main pump 20, the absorption torque characteristic of the main pump 20 controlled by the first torque control pistons 22*f* and 22*g* and the second torque control piston 22*h* is set.

—Operation—

Operation of the second embodiment will be described.

When the operation lever of an optional operation lever device in the plural operation lever devices including the operation lever devices 24A and 124B (see FIG. 1) is operated, the corresponding directional control valve is switched and the hydraulic fluid is supplied to the corresponding actuator. At this time, the directional control valve is switched with a stroke according to the operation amount of the operation lever and the main pumps 20 and 21 driven by the electric motor 1 deliver a flow rate according to the revolution speed of the electric motor 1 and the absorption torque control of the torque control pistons 22*f*, 22*g*, and 22*h* of the regulator 22. The actuator is driven at a speed according to the operation amount of the operation lever.

In the present embodiment, operation of the regulator 22 that carries out the absorption torque control and the directional control valves of the open center type is general and therefore details thereof are omitted.

DC power supplied from the battery 70 or DC power supplied after being converted from AC power by the AC/DC converter 90 from the commercial power supply 92 through the connector 91 or the DC power of both is supplied to the inverter 60 that drives the electric motor 1 through the DC power supply line 65.

The maximum allowable power Pwmax set in advance is input to the controller 55 from the maximum allowable power setting device 81 incorporated in the monitor 80.

The outputs from the pressure sensors 41*a*, 41*b*, and 41*c* as the pump delivery pressures Pps1, Pps2, and Pps3 and the output from the target revolution speed instruction dial 51 as the target revolution speed Nac are each input to the controller 55.

Processing in the controller 55 will be described below with classification of cases.

(a) Case in which the Target Power Pw123*ac* of the Main Pump 20 and the Main Pump 21 is the Same as or Lower than the Maximum Allowable Power Pwmax (Pw123*ac*≤Pwmax)

The maximum allowable power Pwmax and the target power Pw123*ac* are introduced to the minimum value selecting section 55*k* and Pw123*ac* that is the minimum value is selected, and thus the post-limiting power Pwreg becomes Pwreg=Pw123*ac*.

The post-limiting power Pwreg is multiplied by Pw12*ac*/Pw123*ac* at the gain 55*l* and the post-limiting power Pw12*reg* that can be used by the main pump 20 becomes Pw12*reg*=Pwreg (=Pw123*ac*)×Pw12*ac*/Pw123*ac*=Pw12*ac*.

In the dividing section 55*m*, Pw12*reg*/(Pps1+Pps2)/2 is computed. At this time, Pw12*reg*=Pw12*ac* holds in the case of Pw123*ac*≤Pwmax. Therefore, the post-limiting flow rate Q12*reg* becomes Q12*reg*=Pw12*reg*/(Pps1+Pps2)/2=Pw12*ac*/(Pps1+Pps2)/2=Q12*ac*.

In the dividing section 55*n*, Q12*reg*/(2×q12) is computed. At this time, Q12*reg*=Q12*ac* holds as described above. Therefore, the post-limiting revolution speed Nreg becomes Nreg=Q12*reg*/(2×q12*ac*)=Q12*ac*/(2×q12)=Nac.

The post-limiting revolution speed Nreg and the target revolution speed Nac are input to the minimum value selecting section 55*o* and the minimum value is selected. At this time, Nreg=Nac holds as described above. Therefore, the command revolution speed Nd output from the controller 55 to the inverter 60 becomes Nd=Nac without being limited by the minimum value selecting section 55*o*.

(b) Case in which the Target Power Pw123*ac* of the Main Pump 20 and the Main Pump 21 is Higher than the Maximum Allowable Power Pwmax (Pw123*ac*>Pwmax)

The maximum allowable power Pwmax and the target power Pw123*ac* are introduced to the minimum value selecting section 55*k*. In this case, the maximum allowable power Pwmax is selected as the minimum value and the post-limiting power Pwreg becomes Pwreg=Pwmax.

The post-limiting power Pwreg is multiplied by Pw12*ac*/Pw123*ac* at the gain 55*l* and Pw12*reg*=Pwreg (=Pwmax)×Pw12*ac*/Pw123*ac* is calculated regarding the post-limiting power Pw12*reg* that can be consumed by the main pump 20.

The post-limiting flow rate Q12*reg* is calculated as Q12*reg*=Pwmax×Pw12*ac*/Pw123*ac*/(Pps1+Pps2)/2 by the dividing section 55*m*. At this time, since originally a relation of Q12*ac*=Pw12*ac*/(Pps1+Pps2)/2 holds, a relation of Q12*reg*/Q12*ac*=Pwmax/Pw123*ac* (<1) holds from these two expressions.

Subsequently, the post-limiting revolution speed Nreg is calculated as Nreg=Q12*reg*/(2×q12)=Q12*ac*×(Pwmax/Pw123*ac*)/(2×q12) by the dividing section 55*n*. Also in this case, since originally a relation of Nac=Q12*ac*/(2×q12) holds, a relation of Nreg/Nac=Q12*reg*/Q12*ac*=Pwmax/Pw123*ac* (<1) holds from these two expressions.

The post-limiting revolution speed Nreg and the target revolution speed Nac are input to the minimum value selecting section 55*o*. At this time, since Nreg<Nac holds as described above, Nreg that is the smaller value than the target revolution speed Nac is selected as the command revolution speed Nd and is output from the controller 55 to the inverter 60.

—Effects—

In the present embodiment, the following effects are obtained.

1. The controller 55 calculates the target power Pw123*ac* to be consumed by the main pumps 20 and 21 on the basis of the capacities q12 and q3 of the main pumps 20 and 21, the delivery pressures Pps1, Pps2 and Pps3 of the main pumps 20 and 21 sensed by the pressure sensors 41*a*, 41*b*, and 41*c*, and the target revolution speed Nac of the electric motor 1 and outputs the command revolution speed Nd to the inverter 60 to limit the target revolution speed Nac of the electric motor 1 in such a manner that the target power Pw123*ac* falls within the range of the maximum allowable power Pwmax. Therefore, similarly to the first embodiment, the power consumption of the electric motor 1 is surely limited to be equal to or lower than the maximum allowable power Pwmax. This prevents abnormal lowering of the voltage of the battery 70 that supplies electric power to the electric motor 1 and operation of the breaker of the commercial power supply 92 to the interruption position in operation of the electrically driven hydraulic work machine and can surely prevent a sudden stop of the front work implement 104.

Furthermore, the same effects as items 2 to 5 of the first embodiment are obtained, such as the effect that the operator of the electrically driven hydraulic work machine does not need to operate the target revolution speed instruction dial 51 of the electric motor 1 and therefore troublesomeness of operation can be eliminated.

2. The hydraulic drive system includes, as the hydraulic pump, plural hydraulic pumps including the two main pumps 20 and 21 (first and second hydraulic pumps) and includes, as the pressure sensor, plural pressure sensors including the first pressure sensors 41*a* and 41*b* and the second pressure sensor 41*c* that sense the respective delivery pressures Pps1, Pps2 and Pps3 of the two main pumps 20 and 21. The controller 55 calculates the target power Pw123*ac* to be consumed by the two main pumps 20 and 21 (first and second hydraulic pumps) on the basis of the capacities q12 and q3 of the two main pumps 20 and 21 (first and second hydraulic pumps), the delivery pressures Pps1, Pps2 and Pps3 of the two main pumps 20 and 21 sensed by the first pressure sensors 41*a* and 41*b* and the second pressure sensor 41*c*, and the target revolution speed Nac of the electric motor 1.

Due to this, also when the hydraulic drive system includes the plural hydraulic pumps (main pumps 21 and 22) as the hydraulic pump, the target power Pw123*ac* to be consumed by the plural hydraulic pumps (two main pumps 20 and 21) can be calculated and the target revolution speed Nac of the electric motor 1 can be limited in such a manner that the target power Pw123*ac* falls within the range of the maximum allowable power Pwmax.

3. The main pump 20 is the variable displacement type and the main pump 21 is the fixed displacement type. The regulator 22 of the main pump 20 (first hydraulic pump) includes the torque control pistons (first torque control pistons) 22*f* and 22*g* and the torque control piston (second torque control piston) 22*h* to which the delivery pressures of the main pump 20 and the delivery pressure of the main pump 21 (second hydraulic pump) are each introduced and that control the capacity of the main pump 20 in such a manner that the total of the absorption torque of the main pump 20 and the absorption torque of the main pump 21 does not exceed a predetermined value, and carries out total torque control. Also in this case, the controller 55 can calculate the target power Pw123*ac* to be consumed by the two main pumps 20 and 21 and limit the target revolution speed Nac of the electric motor 1 in such a manner that the target power Pw123*ac* falls within the range of the maximum allowable power Pwmax because the same absorption torque characteristic as the absorption torque characteristic of the main pump 20 is set in the table 55*c* of the controller 55 and the same absorption torque characteristic as the absorption torque characteristic of the main pump 21 is set in the table 55*h*.

DESCRIPTION OF REFERENCE CHARACTERS

1: Electric motor
2: Main pump of the variable displacement type (hydraulic pump)
3*a* to 3*h*: Actuator
4: Control valve block
5: Hydraulic fluid supply line
5*a*, 5*b*, 5*c*: Hydraulic fluid supply line
6*a* to 6*c*: Directional control valve
7*a* to 7*c*: Pressure compensating valve
8*a* to 8*c*: Check valve
9*a* to 9*c*: Shuttle valve
11: Differential pressure reducing valve
12, 22: Regulator
12*d*: Torque control piston
12*e*, 22*e*: Spring
12*c*: Flow rate control piston
12*b*: LS valve
13: Prime mover revolution speed sensing valve
14: Main relief valve
14*a*, 14*b*, 14*c*: Main relief valve
15: Unloading valve
15*a*, 15*c*, 15*d*: Pressure receiving part
15*b*: Spring
20: Main pump of the variable displacement type (first hydraulic pump)
21: Main pump of the fixed displacement type (second hydraulic pump)
22*f*, 22*g*, 22*h*: Torque control piston
30: Pilot pump
31*a*, 31*b*, 31*c*: Pilot pressure supply line
24: Gate lock lever
32: Pilot relief valve
40: Control valve block
41: Pressure sensor
41*a*, 41*b*, 41*c*: Pressure sensor
50, 55: Controller
51: Target revolution speed instruction dial
60: Inverter

65: DC power supply line
70: Battery
80: Monitor
81: Maximum allowable power setting device
90: AC/DC converter
91: Connector
92: Commercial power supply
100: Selector valve

The invention claimed is:

1. An electrically driven hydraulic work machine comprising an electric motor, a hydraulic pump driven by the electric motor, an inverter for controlling a revolution speed of the electric motor, and a controller that outputs a command revolution speed for controlling the revolution speed of the electric motor on a basis of a target revolution speed of the electric motor, and drives the hydraulic pump to carry out work, wherein the electrically driven hydraulic work machine comprises:

a maximum allowable power setting device that sets maximum allowable power allowed to be consumed by the electric motor, a pressure sensor that senses a delivery pressure of the hydraulic pump, and a target revolution speed instruction device that makes an instruction of the target revolution speed of the electric motor, and the controller is configured to calculate target power to be consumed by the hydraulic pump on a basis of a capacity of the hydraulic pump, the delivery pressure of the hydraulic pump sensed by the pressure sensor, and the target revolution speed of the electric motor instructed by the target revolution speed instruction device, calculate a first target revolution speed of the electric motor on a basis of a lower one of the target power and the maximum allowable power set by the maximum allowable power setting device, select, as a second target revolution speed, a lower one of the calculated first target revolution speed and the target revolution speed of the electric motor instructed by the target revolution speed instruction device, and outputting the selected second target revolution speed to the inverter as the command revolution speed, wherein the converter controls the revolution speed of the electric motor on a basis of the command target revolution speed in such a manner that the target power falls within a range of the maximum allowable power, wherein the hydraulic pump includes a plurality of hydraulic pumps including a first hydraulic pump and a second hydraulic pump, the pressure sensor includes a plurality of pressure sensors including a first pressure sensor that senses a delivery pressure of the first hydraulic pump and a second pressure sensor that senses a delivery pressure of the second hydraulic pump, and the controller is configured to calculate power to be consumed by the first and second hydraulic pumps as the target power on a basis of capacities of the first and second hydraulic pumps, the delivery pressures of the first and second hydraulic pumps sensed by the first and second pressure sensors, and the target revolution speed of the electric motor, and wherein the first hydraulic pump is a variable displacement type and the second hydraulic pump is a fixed displacement type, the first hydraulic pump has a regulator including first and second torque control pistons to which the delivery pressure of the first hydraulic pump and the delivery pressure of the second hydraulic pump are introduced respectively and that control the capacity of the first hydraulic pump in such a manner that a total of absorption torque of the first hydraulic pump and absorption torque of the second hydraulic pump does not exceed a predetermined value, the controller includes a first table in which the same characteristic as the absorption torque characteristic of the first hydraulic pump controlled by the first and second torque control pistons is set, and a second table in which the same characteristic as the absorption torque characteristic of the second hydraulic pump is set, the controller is further configured to:

refer to the delivery pressure of the first hydraulic pump sensed by the first pressure sensor in the first table to calculate the capacity of the first hydraulic pump, and calculate the first target power by using the calculated capacity of the first hydraulic pump, the target revolution speed of the electric motor, and the delivery pressure of the first hydraulic pump sensed by the first pressure sensor, refer to the delivery pressure of the second hydraulic pump sensed by the second pressure sensor in the second table to calculate the capacity of the second hydraulic pump, and calculate the second target power by using the calculated capacity of the second hydraulic pump, the target revolution speed of the electric motor, and the delivery pressure of the second hydraulic pump sensed by the second pressure sensor, and calculate the target power by adding the first target power and the second target power.

2. The electrically driven hydraulic work machine according to claim 1 wherein the controller is further configured to: calculate the first target revolution speed of the electric motor by dividing a lower of the target power and the maximum allowable power set by the maximum allowable power setting device by the delivery pressure of the hydraulic pump and the capacity of the hydraulic pump.

3. The electrically driven hydraulic work machine according to claim 1, further comprising a power supply that supplies electric power to the electric motor, wherein a plurality of values are stored in the maximum allowable power setting device according to kinds of the power supply as the maximum allowable power.

* * * * *